April 7, 1970  J. H. BORNZIN  3,504,508
UNIVERSAL JOINT SHIELDING
Filed Sept. 23, 1968  4 Sheets-Sheet 1
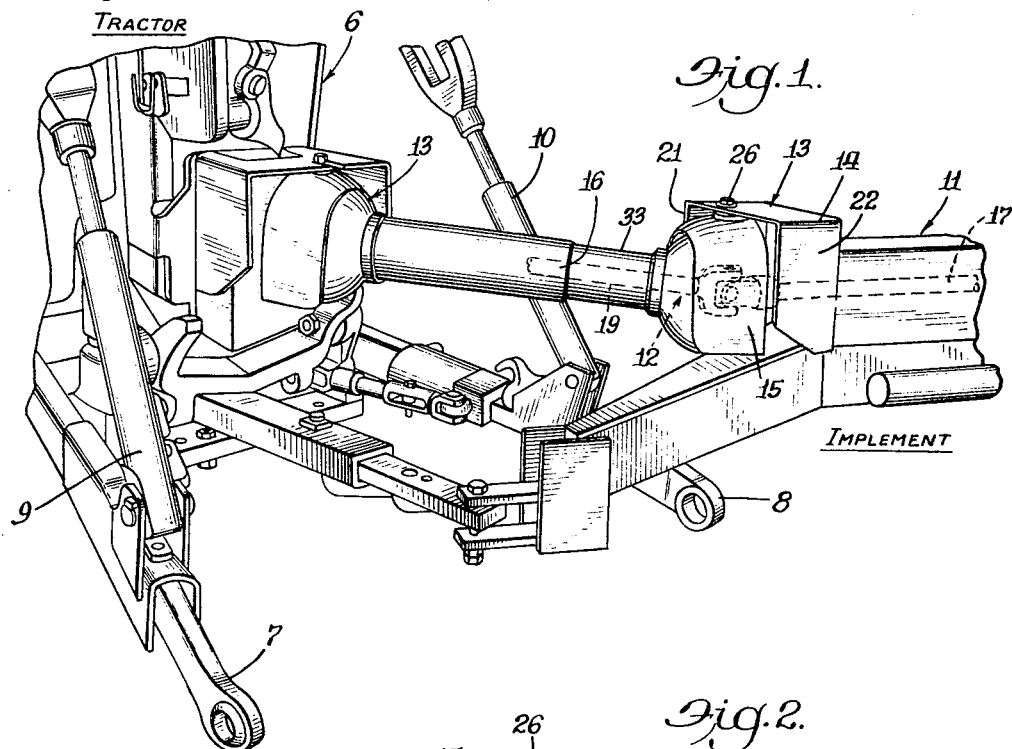
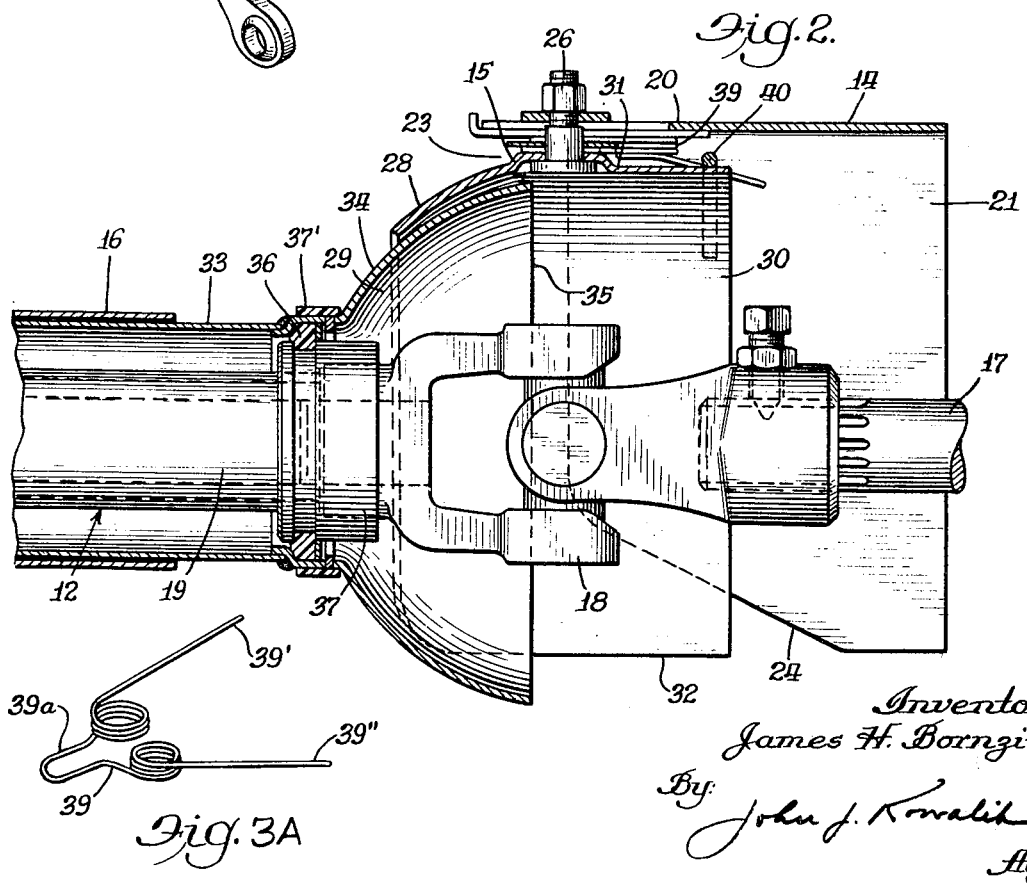
Inventor:
James H. Bornzin
By John J. Kowalik
Atty.

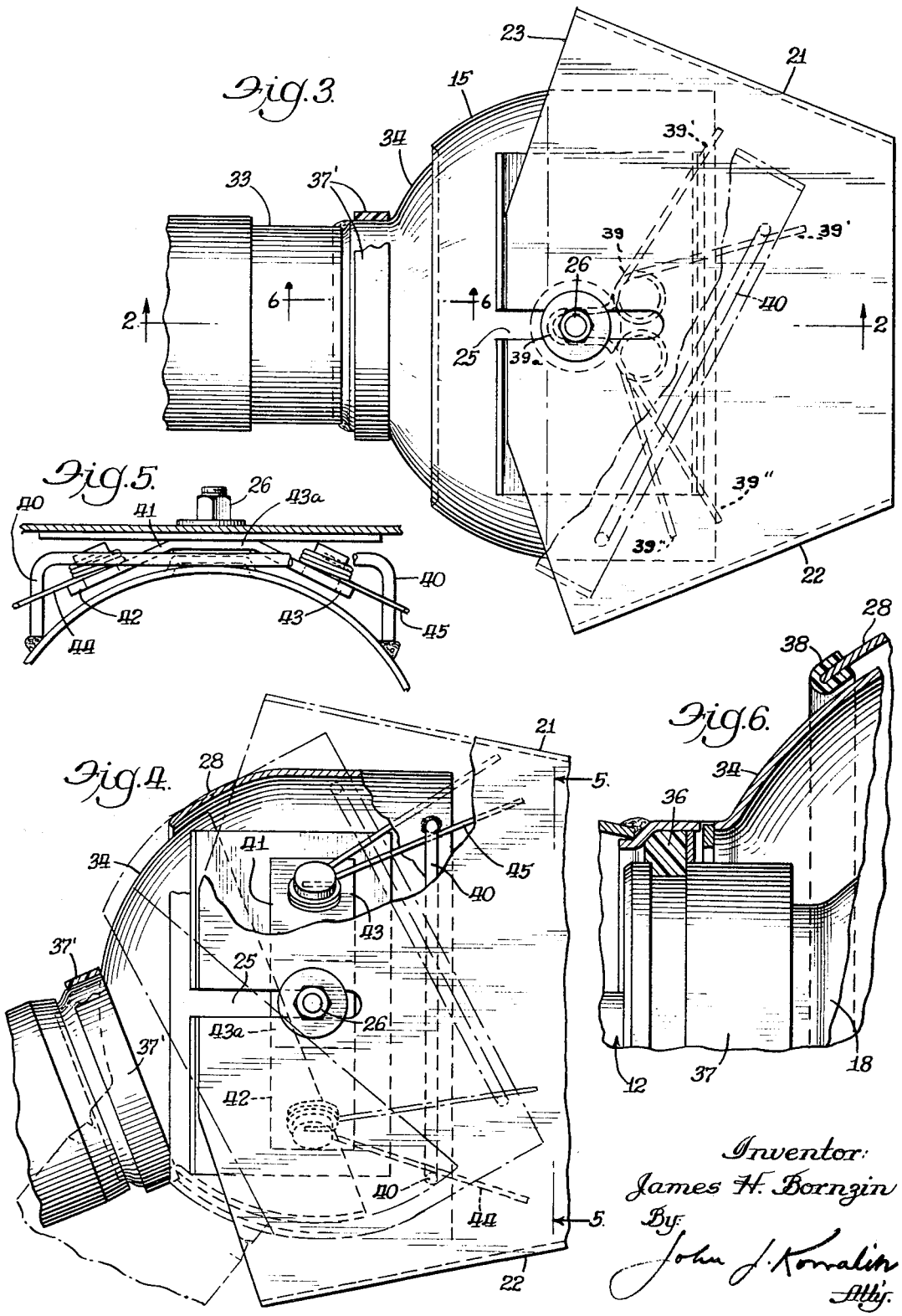

April 7, 1970 J. H. BORNZIN 3,504,508
UNIVERSAL JOINT SHIELDING
Filed Sept. 23, 1968 4 Sheets-Sheet 3
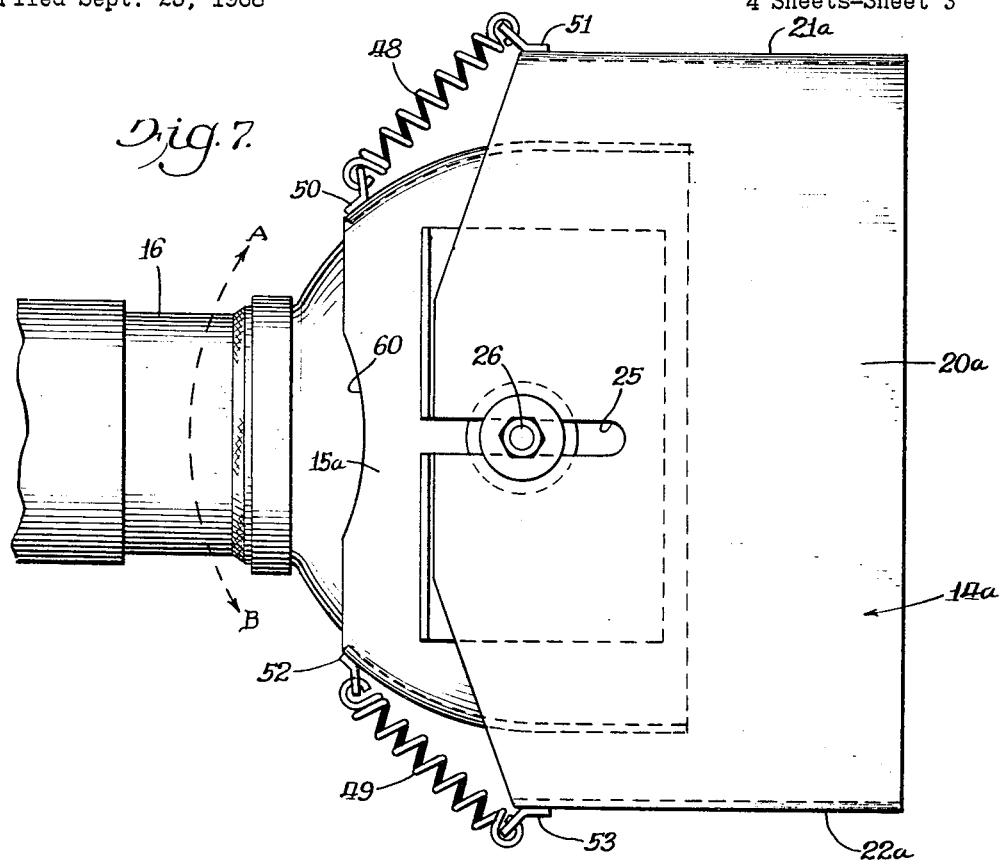
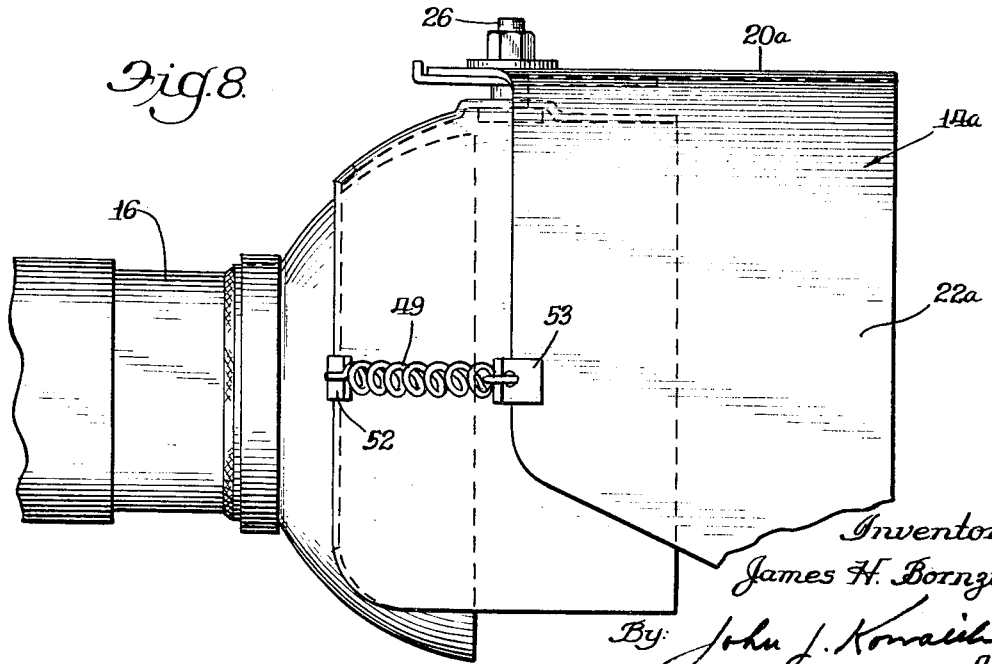
Inventor:
James H. Bornzin
By John J. Kovach
Atty April 7, 1970 J. H. BORNZIN 3,504,508
UNIVERSAL JOINT SHIELDING
Filed Sept. 23, 1968 4 Sheets-Sheet 4

Inventor:
James H. Bornzin
By John J. Kowalik
Atty.

3,504,508
UNIVERSAL JOINT SHIELDING
James H. Bornzin, La Grange, Ill., assignor to International Harvester Company, Chicago, Ill., a corporation of Delaware
Filed Sept. 23, 1968, Ser. No. 761,605
Int. Cl. F16c *1/06;* F16d *3/84*
U.S. Cl. 64—3                                                                 20 Claims

ABSTRACT OF THE DISCLOSURE

A protective shielding for an articulate power driven shaft arrangement to a machine the shielding comprising an outer stationary housing enclosing a fixed portion of the shaft, and a telescoping housing encompassing the pivotal portion of the shaft and a swingable intermediate housing covering the articulated portion of the shaft and being cooperatively disposed between the outer and telescoping housings to provide shielding therebetween for all possible operating positions of the pivotal shaft portion, and the swingable intermediate housing having a self-centering device to bias it into alignment with the outer housing.

BACKGROUND OF THE INVENTION

In the use of power apparatus, especially the type related to farm and construction usage, mechanical power is transmitted from a mobile prime mover to an attached implement. The power transfer is accomplished by a power driven shaft arrangement, which under normal circumstances is coupled to a non-pivotal power take-off stub shaft. Since in most cases the implement is not rigidly attached to the prime mover the power driven shaft arrangement therebetween must be articulated to compensate for relative motion between the prime mover and the implement. In such applications, a universal joint is used proximate the power take-off shaft to serve as an articulate coupling joining the power take-off shaft to a telescoping drive shaft and the drive shaft extends to the attached implement and is connected to a power input shaft through another universal joint.

When operating power driven equipment the dangers of injury to negligent personnel by coming into contact with an exposed power driven shaft arrangement of the type described may occur; and the instant invention concerns itself with the problem of providing an inexpensive, but yet durable and functional protective shielding for the type of power shaft arrangement heretofore described and to provide an effective covering of the shaft arrangement for all operating field conditions; but yet allowing ease of access to the shaft for normal maintenance thereby eliminating the need to disassemble or remove the shielding repeatedly for such maintenance which so often results in the shielding being left off entirely.

OBJECTS OF THE PRESENT INVENTION

A general and broad object of the present invention is to provide a protective shielding of novel construction of the foregoing general character which will effectively cover a rotatable articulated shaft arrangement of the general type heretofore described.

Another object of the invention is to cover the power take-off shaft portion with a stationary housing, and the pivotal shaft portion with an encompassing telescoping housing, and the interconnecting articulated shaft portion with an intermediate swingable housing which is capable of effectively enclosing said articulated shaft portions notwithstanding the angular deviations of the pivotal shaft portions.

A still further object is that the intermediate swingable housing have predetermined lateral areas of engagement with said telescoping housing for pivoting the intermediate housing and self-centering means to bias said swingable housing into alignment with said stationary housing.

Still another object is that the outer stationary housing and intermediate housing have a general U-shape configuration and be mutually connected and disposed to provide access to portions of the shaft arrangement requiring maintenance.

BRIEF DESCRIPTION OF THE DRAWINGS

FIGURE 1 is a perspective view of a tractor implement combination incorporating the invention;

FIGURE 2 is an enlarged sectional view taken substantially on line 2—2 of FIGURE 3;

FIGURE 3 is a plan view of the instant invention showing the housings in alignment and featuring a single spring self-centering means for the intermediate housing; the shaft and universal joint have been deleted for clarity;

FIGURE 3A is a perspective view of a single spring component in the embodiment of FIGURE 3;

FIGURE 4 is a plan view taken at a position similar to that of FIGURE 3 showing the housing positionally askew and featuring a dual spring self-centering for the intermediate housing; the shaft and universal joint being deleted for clarity;

FIGURE 5 is a sectional view, with parts broken away, taken substantially at line 5—5 of FIGURE 4 and showing the positional arrangement of the dual spring self-centering means with respect to the outer-stationary housing and the intermediate swingable housing;

FIGURE 6 is a partial sectional view taken substantially at line 6—6 of FIGURE 3 showing an alternate bumper arrangement to prevent scoring of telescoping housing;

FIGURE 7 is a plan view of the instant invention showing a variation thereof;

FIGURE 8 is a side view of the variation illustrated in FIGURE 8;

DESCRIPTION OF THE PREFERRED EMBODIMENT

Figure 9:
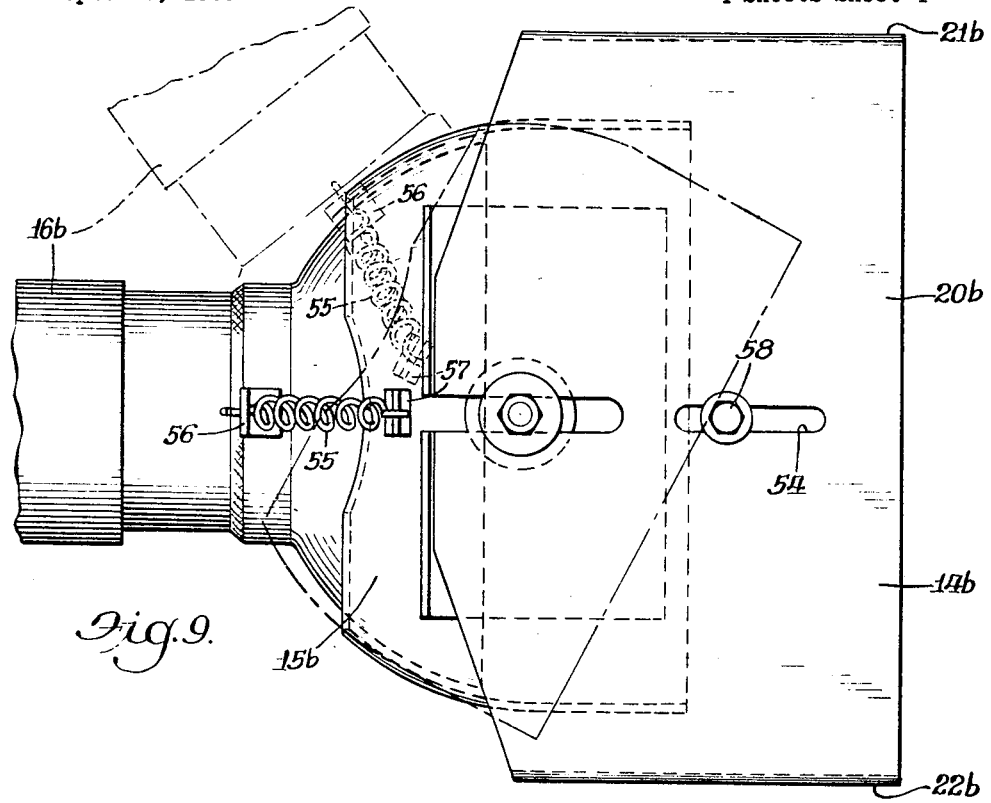
FIGURE 9 is a plan view of the instant invention showing another self-centering means.

Attention is invited to FIGURE 1 which illustrates a partial view of a typical tractor generally designated 6 having a conventional hitch comprising draft linkages 7 and 8 with lift linkages 9 and 10, and a portion of a tractor drawn implement 11, and having therebetween an articulated power shaft system 12 which is covered by the instant invention, i.e. a protective shielding assembly, generally designated 13. As seen in FIGURE 1 the shielding assembly 13 is being used to enclose those articulated portions of the shaft 12 which are adjacent to both the tractor 6 and the implement 11. The construction and operational principles of the shielding assembly 13 as used in either position is substantially identical and therefore only that embodiment adjacent the implement 11 will be described in detail.

The protective shielding 13 comprises three operatively interrelated housings; namely, a stationary housing 14 which covers a stub shaft 17 that extends from said implement 11, an intermediate housing 15 covering a universal joint 18, and tubular housing 16 which encompasses a pivotal drive shaft 19.

The stationary housing 14 is a generally wedge-shaped structure in a horizontal plane having an elongated concavity therethrough and comprises a top wall 20 disposed in a substantially horizontal orientation. Extending downwardly from the top wall 20 are divergent lateral side walls 21 and 22 effecting a front opening 23 and a bottom opening 24 with the walls 21 and 22 so arranged as to define said elongated concavity as one with an incremental cross-section having a minimum at the rear of housing 14 to a maximum at the front opening 23 of the same said housing.

The terms "front" and "rear" as used herein are to be construed merely as conveniences to describe the invention herein disclosed and are not intended as limitations. The term "enclose" and variations thereof are meant to include, but not to be restricted to, structures partially encompassing parts such as the various three-sided shields shown in the drawings.

The top wall 20 has a centrally located slot 25 extending from said front opening 23 toward the rear and is suitable for adjustably receiving a shouldered bolt assembly 26 which clamps to the housing 14 and carries intermediate housing 15 in a position partially within the elongated cavity of the stationary housing 14.

The intermediate housing 15 is a hollow U-shaped structure covering the universal joint 18 and having a bell-shaped front portion 28 converging to a forward opening 29, and an open rear portion 30 having an essentially U-shaped cross-section which is substantially larger than said forward opening 29. The entire upper portion of housing 15 is an arcuate segment 31 having a centrally located hole for receiving the shouldered bolt assembly 26 which retains and suspends said housing 15 within the stationary housing 14 in such a manner that as housing 14 hangs imbricately within the housing 15 and projects through said opening 23 the shouldered bolt assembly 26 retains, but yet permits the intermediate housing 15 to swing about within the confines of said outer stationary housing 14. It should be noted at this time that by adjusting the bolt assembly 26 either fore or aft along the slot 25 the intermediate housing 15 is correspondingly moved either forwardly or rearwardly thereby providing a method by which the central vertical axis of the housing 15 can be approximately aligned with the dead-center point of the universal joint 18 to yield optimum angularity of the shaft system 12 as confined by shielding assembly 13.

Another significant feature of the invention that should be considered is that the intermediate housing 15 has a bottom opening 32 which is substantially aligned with the bottom opening 24 of outer housing 14, and the two openings combine to provide an adequate access for maintenance to the universal joint 18 without the need of removing or dismantling the shielding assembly 13.

The housing 16 comprises a telescoping tubular part 33 merging into a flared bell-shaped end segment 34 terminating in a rearwardly facing opening 35. The end segment 34 is disposed within and in extension to housing 15 with the overall dimensions of that part of housing 16 being slightly smaller than those of the interior of the housing 15.

The entire housing 16 is symmetrically spaced and retained about the pivotal shaft 17 by an annular antifriction spacer 36 which is retained by a grooved hub 37 secured onto the pivotal drive shaft 19 at a position adjacent the universal joint 18. It is to be understood that other similar suitably placed spacers, which are not shown, would be needed to adequately support the housing 16 about the drive shaft 19.

As best seen in FIGURES 3 and 4 the bell-shaped portion 34 of housing 16 is disposed within the housing 15, as hereinbefore described, with adequate clearances to prevent interior lateral grazing of the housings 15 and 16. However, as pivotal shaft 19 is angulated, housing 16 will also correspondingly angulate and engage housing 15 along predetermined areas of engagement and that portion of housing 15 defining the opening 29 to consequentially bias the housing 15 in the same direction; therefore, securely mounted about the exterior of the tubular part 33 and adjacent segment 34 at the areas of engagement of housing 16 with 15 there is securely placed an environal band 37' of tough anti-friction material such as nylon, to provide a buffer region to prevent scoring because of an abrading action attendant the engagement of the two housings. FIGURE 6 shows an alternative method of providing protection for housings 15 and 16 in lieu of the ring 37'. By attaching a band 38 of similar anti-friction material about the edge of that portion of the housing 15 defining the opening 29 to thereby act as a fender between the two housings at the areas of engagement the housings 15 and 16 are protected against damage by said abrading action.

During normal operation the drive shaft 19 can angulate from substantial alignment with the stub shaft 17 and as this occurs, the housing 16 mounted thereon will eventually engage housing 15 and thereby cause it to swing in a corresponding direction and in consideration of this another novel feature of the instant invention provides that upon substantial re-alignment of the two shafts self-centering means incorporated into the shielding assembly will bias the intermediate housing 15 back into substantial alignment with the stub shaft 17. To effect this result the self-centering means comprising a torsional spring element acting upon housing 15 has been developed.

Referring to FIGURE 3 a single spring 39 having dual torsion arms is shown. In FIGURES 2 and 3 it is seen that the middle part 39a of the spring 39 is rigidly secured about the shouldered bolt assembly 26 being clamped thereby with each torsion arm 39' and 39'' of said spring 39 extending outwardly and rearwardly over the intermediate housing 15, wherein said arms are retained by an elongated U-shaped reactive element 40 which is symmetrically attached to the rear part of the upper arcuate segment 31 of the housing 15 at a location to provide sufficient moment to bias housing 15 into alignment with said stub shaft 17. Element 40 engages and loads either said torsion arm 39' or 39'' of spring 39 as housing 15 is caused to pivot by housing 16, and it is this spring loading coacting with the element 40 that provides the torque necessary to bias the housing 15 into alignment.

FIGURES 5 and 6 illustrate a second torsion spring device for biasing the housing 15 into alignment. Instead of a single spring with dual torsion arms of spring 39 this device comprises a mounting strap 41 having side tabs 42 and 43 and an intervening connector bar 43a wherein said strap 41 is rigidly secured about bolt assembly 26 between the housings 14 and 15 and disposed substantially normal to stub shaft 17 with each said tab respectively extending outwardly and downwardly over each side of said housing 15. The tab 42 has affixed thereto a torsion spring 44 with a single arm and in like manner a similar torsion spring 45 is attached to the tab 43 with each spring having its respective torsion arm extending rearwardly and outwardly to be actively retained by the reactive element 40. The mode of operation of this second spring device is substantially the same as hereinbefore described for the self-centering means using the spring 39.

A modified embodiment of the instant invention is shown in FIGURES 7 through 10 wherein a rectangularly shaped outer stationary housing 14a having substantially parallel side walls 21a and 21b with a cooperating top wall 20a but otherwise substantally the same as housing 14 has been used in lieu of housing 14. A modified intermediate housing 15a modified from housing 15 by a notch 60 has also been shown and will be discussed hereinbelow.

FIGURE 7 also illustrates still another means to hold and bias the intermediate housing into alignment with the outer stationary housing. It can be seen that tension springs 48 and 49 are operatively mounted between the forward portions of housings 14a and 15a by means of eyelets 50, 51 and 52, 53 respectively, which in turn are securely affixed to the housings at their respective locations. The elevational position of the spring 49 is approximately midway between the same said housings as shown in FIGURE 8. The spring 48 is similarly positioned on the opposite side of the housings. With the springs 48 and 49 mounted thus it can be appreciated that as the housing 16 angulates in direction A, and engages the housing 14a causing it to turn in a corresponding direction, the spring 48 relaxes and the spring 49 elongates to provide a force that will continually bias the housing 15a into alignment with the stationary housing 14a. In like manner a similar action takes place when the housing 16 angulates in B direction with the spring 48 now providing the biasing force. As the housing 16 resumes a non-engaging position with respect to the housing 15a the springs 48 and 49 coact to retain the housing 15 in an aligned position with respect to the stationary housing 14a. It also should be noted when the housing 15a is pivotally supported and subject to be swung upwardly and forwardly that both the springs 48 and 49 coact to bias it into alignment with the housing 14a.

Figure 10:
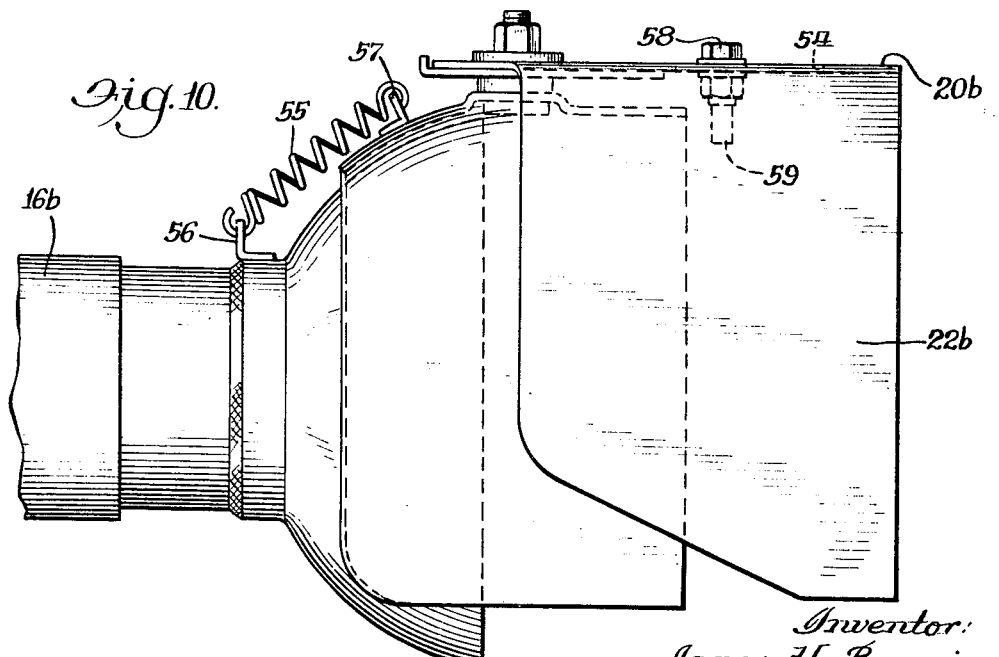
FIGURE 10 is a side view of the invention as illustrated in FIGURE 9.

In lieu of the self-centering means acting between the intermediate and stationary housings as heretofore described a novel biasing means cooperating between pivotal tubular housing and the intermediate housing can be provided. In FIGURES 9 and 10 this biasing means is shown. The biasing means comprise a tension spring 55 mounted between housings 16b and 15b by means of eyelets 56 and 57 securely affixed thereto to position the spring 55 in substantial alignment with the stub shaft 17. The housings 16b and 15b are essentially the same as housings 16 and 15a respectively except for the addition of the eyelets 56 and 57 respectively. Stationary housing 14b comprising side walls 21b and 22b and a top wall 20b which has been provided with a centrally and rearwardly disposed slot 54. The slot 54 receives a stop 58 which is adjustably secured therethrough. The stop 58 has a downwardly extending portion 59 which engages and prevents the intermediate housing from rotating far enough to contact the universal joint or stub shaft. The slot 54 also allows the position of stop 58 to be selected for optimum angularity of the instant invention relative to various size universal joints. As the housing 16b swings from side to side the spring 55 resists elongation and thereby causes the intermediate housing 15b to follow the movement of the housing 16b. However, when the housing 15b engages the portion 59 of the stop 58 and is restrained thereby (FIGURE 9), and the housing 16b continues to angulate even further from center, the spring 55 is elongated to provide additional force for biasing the housings into alignment.

The novel and unique design of the instant invention enables it to provide protective shielding of the rotatable power shaft system 12 for a multiplicity shaft position normally encountered in actual field operations using drives of this type. Referring to FIGURE 2, it has been found that pivotal drive shaft can be angled up to 30 degrees vertically with respect to stub shaft 17 before engagement between the housings 15 and 16. This amount of angular deviation is well beyond vertically displacement angles to which the universal joint 18 would be practically subject under normal field conditions. When additional vertical angular displacement is to be encountered it is possible to inexpensively accommodate for this by forming notch 60 as shown embodied in the modified intermediate housing 14a of FIGURES 7 and 9. It can be readily observed that the notch 60 is disposed to allow the tubular part 33 of the housing 16 additional upward travel before engagement with the modified housing 14a. It is to be understood that if need be the vertical range of angulation of shaft 19 with respect to shaft 17 could be further substantially increased by using a swivelable connecting means in lieu of the bolt assembly 26 to enable the intermediate housing 15 to pivot forwardly and upwardly. It is contemplated that a bolt assembly having incorporated therein a swiveling means could effect this result and thereby accommodate unusual conditions requiring such extreme angular displacements between the shafts 17 and 19.

The shielding assembly 13 also permits ample horizontal angular displacement between the shafts 17 and 19 while providing protective covering for the shaft system 12. Referring to FIGURE 4 the protective shielding assembly 13 is shown in various positions corresponding to respective angular displacements of the two shafts. It is found that the pivotal shaft 19 can be deviated approximately 22 degrees to the right (or left) with respect to the center of shaft 17 before the telescoping housing 16 engages the swingable housing 15. As the shaft 19 is angularly deviated even further relative to shaft 17 the swingable housing 15 is engaged and swung about to allow an additional angular displacement up to 60 degrees from the center of shaft 17 while affording full protection from the rotating members of the shaft system 12.

For the sake of clarity only deviations to the left of center have been depicted in FIGURE 4; but it is to be understood that the shielding assembly 13 will function in an equivalent manner when the shaft 19 is deflected to the right of center.

It can be observed that the instant invention 13 not only protectively covers the shaft system 12 in the positions heretofore described, but is also correspondingly positionable in a protective relationship for an infinite number of angular deviations of the shafts 17 and 19 within the angular displacements hereinbefore described.

It has been found that the instant invention, the protective shielding assembly 13 herein described is a versatile protective assemblage adaptable to a variety of applications and capable of providing ample protection from articulated rotating shafts inexpensively without unduly restricting operational capabilities of the power transferring system which it serves.

It will be appreciated that the embodiment of the invention chosen for the purpose of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be understood that the particular structure and functional aspect emphasized herein are not intended to exclude but rather to suggest such other modifications and adaptations as fall within the spirit and scope of the invention as defined in the appended claims.

What is claimed is:

1. A protective shield enclosing an articulated portion of a drive shaft assembly, said shield comprising: a stationary housing disposed in a stationary orientation about said shaft, an end housing disposed on and encompassing said shaft, and an intermediate housing articulately disposed under said stationary housing and over said end housing in imbricate relation thereto, and said intermediate and end housings having predetermined lateral areas of engagement which engage upon articulation of said shaft and serve for urging said intermediate housing to follow said end housing attendant to angular displacement of said shaft.

2. The invention according to claim 1 and said intermediate housing having a connection to said stationary housing and swingably connecting said intermediate housing within said stationary housing, and self-centering means comprising spring means connected between said stationary housing and said intermediate housing and serving to bias the latter into alignment with the former.

3. The invention according to claim 2 and said spring means comprising a spring operatively interconnected between said intermediate and end housings, and said spring connected to said intermediate housing in spaced relation to said connection of said stationary and intermediate housings to provide a moment to correspondingly bias the intermediate and end housings into alignment in response to an action of said spring attendant positional changes of said end housing.

4. The invention according to claim 2 and said spring means comprising a torsional spring element having a reaction arm, said element stationarily affixed relative to said stationary housing, and said reactive arm and intermediate housing coacting to bias said intermediate housing into alignment with said stationary housing.

5. The invention according to claim 4 and said torsional spring element having dual reactive arms disposed in coactive relationship with said intermediate housing, wherein said coactive relationship corresponds respectively to the direction of swing of the same said housing.

6. The invention according to claim 1 and said end housing at said lateral areas of engagement having an anti-scoring material affixed thereto to preserve said intermediate and end housing upon interengagement therebetween.

7. The invention according to claim 1 and said intermediate housing at said lateral areas of engagement having an anti-scoring material affixed thereto to preserve said intermediate and end housing upon interengagement thereof.

8. The invention according to claim 1 and said intermediate housing having a connection to said stationary housing and swingably connecting said intermediate housing within said stationary housing, and self-centering means comprising a spring operatively connected between said end and intermediate housing to serve to bias the latter into alignment with the former.

9. A shielding for first and second rotatable shaft portions having an articulate coupling end-connecting respective end portions of said shafts to permit relative angular displacement thereof, a stationary first housing axially enclosing said first shaft portion and having a stationary orientation in spaced relation to said first shaft portion, an intermediate housing enclosing said coupling in spaced relation thereto having a connection to said first housing permitting libratory movement and rotation of said intermediate housing about said connection and within said first housing, a second housing encompassing said second shaft portion and disposed thereon in spaced relation thereto and extending into imbricated relation within said intermediate housing, said second housing having predetermined lateral areas of engagement with said intermediate housing to bias for angulating the same upon articulation of said first and second shaft portions while effecting therewith a concomitant enclosure of said shaft portions and coupling.

10. A shielding for first and second rotatable shaft portions having an articulate coupling end-connecting respective end portions of said shafts to permit relative angular displacement thereof, a first housing axially enclosing said first shaft portion in spaced relation thereto, an intermediate housing enclosing said coupling in spaced relation thereto having a connection to said first housing permitting libratory movement and rotation of said intermediate housing about said coupling interiorly of said first housing, a second housing encompassing said second shaft portion in spaced relation thereto and extending into imbricated relation with said intermediate housing said second housing having lateral areas of engagement with said intermediate housing for angulating the same while effecting therewith a concomitant enclosure of said shaft portions and couplings, and said first and second shafts having a point of incidence and said first and intermediate housing having a point of connection perpendicularly aligned with said point of incidence relative to said first shaft.

11. The invention according to claim 10 and said first housing having a stationary orientation relative to said first and second shafts.

12. The invention according to claim 11 and said first and intermediate housing disposed in extension to each other and providing a partial encompassment of said first shaft and said coupling to cooperatively form an access thereto.

13. A shielding for first and second rotatable shaft portions having an articulate coupling end-connecting respectively end portions of said shafts to permit relative angular displacement thereof, a first housing axially enclosing said first shaft portion in spaced relation thereto, an intermediate housing enclosing said coupling in spaced relation thereto having a connection to said first housing permitting libratory movement and rotation of said intermediate housing about said coupling interiorly of said first housing, a second housing encompassing said second shaft portion in spaced relation thereto and extending into imbricated relation with said intermediate housing, said second housing having lateral areas of engagement with said intermediate housing for angulating the same while effecting therewith a concomitant enclosure of said shaft portions and coupling, and said intermediate housing having self-centering means for biasing said intermediate housing into axial alignment with said first shaft.

14. The invention according to claim 13 and said self-centering means comprising a spring element disposed reactively between said intermediate and stationary housing to create a coactive biasing relationship therebetween.

15. The invention according to claim 14 and said spring element comprising a torsional spring having dual reaction arms, each arm corresponding to diametrical directions of swing of said intermediate housing and respectively operative to bias said intermediate housing into said axial alignment.

16. The invention according to claim 14 and said spring element comprising a pair of torsional springs, each spring corresponding to diametrical directions of swing of said intermediate housing and respectively operative to bias said intermediate housing into said axial alignment.

17. A shielding for first and second rotatable shaft portions having an articulate coupling end-connecting respective end portions of said shafts to permit relative angular displacement thereof, a first housing axially enclosing said shaft portion in spaced relation thereto, an intermediate housing enclosing said coupling in spaced relation thereto having a connection to said first housing permitting libratory movement and rotation of said intermediate housing about said coupling interiorly of said first housing, a second housing encompassing said second shaft portion in spaced relation thereto and extending into imbricated relation with said intermediate housing, said second housing having lateral areas of engagement with said intermediate housing for angulating the same while effecting therewith a concomitant enclosure of said shaft portions and coupling, and said second housing having an anti-scoring material affixed thereto upon said lateral areas of engagement to prevent an abrading action between said second housing and intermediate housing, and said intermediate housing having self-centering means for biasing said intermediate housing into axial alignment with said first shaft.

18. A shielding for first and second rotatable shaft portions having an articulate coupling end-connecting respective end portions of said shafts to permit relative angular displacement thereof, a first housing axially enclosing said first shaft portion in spaced relation thereto, an intermediate housing enclosing said coupling in spaced relation thereto having a connection to said first housing permitting libratory movement and rotation of said intermediate housing about said coupling interiorly of said first housing, a second housing encompassing said second shaft portion in spaced relation thereto and extending into imbricated relation with said intermediate housing, second housing having lateral areas of engagement with said intermediate housing for angulating the same while effecting therewith a concomitant enclosure of said shaft portions and coupling, and said intermediate housing having an anti-scoring material affixed thereto upon regions of lateral areas of engagement to prevent an abrading action between said second housing and intermediate housing and said intermediate housing having self-centering means to bias said intermediate housing into alignment with said second housing.

19. A shielding for first and second rotatable shaft portions having an articulate coupling end-connecting respective end portions of said shafts to permit relative angular displacement thereof, a first housing axially enclosing said first shaft portion in spaced relation thereto, an intermediate housing enclosing said coupling in spaced relation thereto having a connection to said first housing permitting libratory movement and rotation of said intermediate housing about said coupling interiorly of said first housing, a second housing encompassing said second shaft portion in spaced relation thereto and extending into imbricated relation with said intermediate housing, said second housing having lateral areas of engagement with said intermediate housing for angulating the same while effecting therewith a concomitant enclosure of said shaft portions and coupling, and said intermediate housing having self-centering means to bias said intermediate housing into alignment with said second housing.

20. The invention according to claim 19 and said self-centering means comprising a spring operatively mounted between said second and intermediate housings, and said spring having an attachment to said intermediate housing in spaced relation to said connection of said intermediate and stationary housing to provide a moment to correspondingly bias the intermediate housing into alignment with said second housing attendant positional changes of said second housing.

References Cited

UNITED STATES PATENTS

| 2,597,308 | 5/1952 | Erhart | 64—3 |
| 2,858,680 | 9/1958 | Harrington | 64—3 |
| 3,053,062 | 9/1962 | Geisthoff | 64—4 |
| 3,418,828 | 12/1968 | Carns | 64—4 X |

FOREIGN PATENTS

| 776,888 | 6/1957 | Great Britain. |

JAMES A. WONG, Primary Examiner

U.S. Cl. X.R.

64—32